(No Model.)

O. R. OLSEN.
PULLEY.

No. 295,796. Patented Mar. 25, 1884.

WITNESSES.
Jacob W. Poeper
Hattie Jacobs.

INVENTOR.
Olaf R. Olsen
By C. F. Jacobs
Atty.

UNITED STATES PATENT OFFICE.

OLAF R. OLSEN, OF INDIANAPOLIS, INDIANA.

PULLEY.

SPECIFICATION forming part of Letters Patent No. 295,796, dated March 25, 1884.

Application filed December 6, 1883. (No model.)

*To all whom it may concern:*

Be it known that I, OLAF R. OLSEN, a resident of Indianapolis, Marion county, Indiana, have made certain new and useful Improvements in Pulleys, a description of which is set forth in the following specification, reference being made to the accompanying drawings, in the several figures of which like letters indicate like parts.

My invention is a split pulley—that is, a pulley made in two halves with bisected boxing, which can be removed from the shaft simply by taking the pulley apart, and will be understood from the following description.

Figure 1:
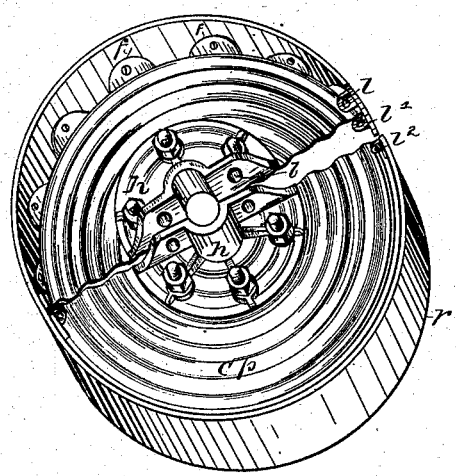
Figure 2:
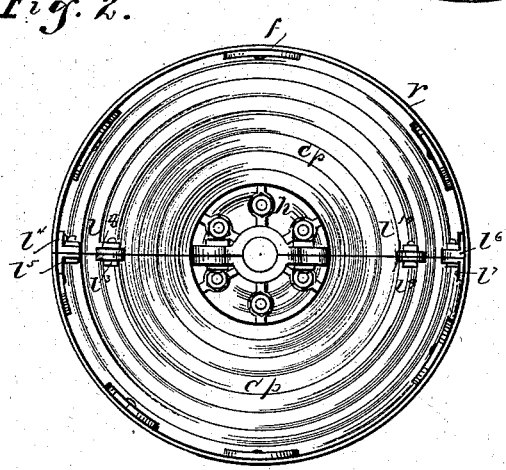
Figure 3:
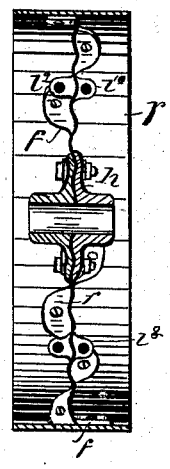

In the drawings, Figure 1 represents a perspective view of my device with the pulley partly opened. Fig. 2 is a plan view of the pulley, the parts closed and bolted together. Fig. 3 is a cross-section along the dividing-line shown in Fig. 2.

In detail, $c\ p$ is the center plate or web of the pulley, which is made of corrugated sheet metal; $h$, the hub, and $r$ the rim; $f$, the flanges turned down from the web on either side, alternately, for fastening the web to the rim. $l\ l'\ l^2$ are lugs with eyes for bolts to hold the rim together when the rim is divided only on one side, and, if divided on both sides, lugs are placed on both sides, as at $l^4$, $l^5$, $l^6$, and $l^7$ in Fig. 2, the modification being a simple one and the principle in both being identical. The two halves of the hub are connected by bolts passing through holes $b$. In addition, if both sides of the rim be divided, lugs are struck up from the web along the division-line above and below the hub, as $l^3$, $l^8$, $l^9$, and $l^{10}$, which are bored to admit bolts, as shown. A pulley made in this way needs no set-screw to prevent its turning or shifting on its shaft, as it is firmly held in the clamp formed by the two sides of the boxing when the latter are closely screwed up.

What I claim, and desire to secure by Letters Patent, is the following:

The split pulley formed of a continuous rim, having one opening adapted to be drawn and secured together by suitable fastenings, in combination with a bisected hub and bisected corrugated metal web, with means for uniting the parts, substantially as described.

In witness whereof I have hereto set my hand this 28th day of November, 1883.

OLAF R. OLSEN.

Witnesses:
 C. P. JACOBS,
 HATTIE JACOBS.